United States Patent [19]
Schober

[11] Patent Number: 4,732,267
[45] Date of Patent: Mar. 22, 1988

[54] TRANSPORT INTALLATION
[75] Inventor: Johann Schober, Gleisdorf, Austria
[73] Assignee: Binder & Co. Aktiengesellschaft, Gleisdorf, Austria
[21] Appl. No.: 932,736
[22] PCT Filed: Feb. 27, 1986
[86] PCT No.: PCT/AT86/00017
  § 371 Date: Nov. 3, 1986
  § 102(e) Date: Nov. 3, 1986
[87] PCT Pub. No.: WO86/05165
  PCT Pub. Date: Sep. 12, 1986
[30] Foreign Application Priority Data
  Mar. 1, 1985 [AT] Austria .................................. 622/85
[51] Int. Cl.[4] .............................................. B65G 21/10
[52] U.S. Cl. ..................................... 198/830; 198/839
[58] Field of Search ................. 198/830, 839, 824, 825
[56] References Cited

U.S. PATENT DOCUMENTS

| | | | |
|---|---|---|---|
| 2,818,962 | 4/1952 | Hurth | 198/839 X |
| 3,212,626 | 10/1965 | McLeish et al. | 198/830 X |
| 3,612,257 | 10/1971 | Goergen et al. | 198/830 X |
| 3,856,133 | 12/1974 | Dyachkov | 198/839 X |
| 4,339,031 | 7/1982 | Densmore | 198/830 X |
| 4,526,272 | 7/1985 | Peterson | 198/839 X |

FOREIGN PATENT DOCUMENTS

| | | | |
|---|---|---|---|
| 0618504 | 7/1978 | U.S.S.R. | 198/839 |
| 0797980 | 1/1981 | U.S.S.R. | 198/839 |
| 0870285 | 10/1981 | U.S.S.R. | 198/830 |

Primary Examiner—Robert J. Spar
Assistant Examiner—D. Glenn Dayoan
Attorney, Agent, or Firm—Kurt Kelman

[57] ABSTRACT

A transport installation comprises a conveyor belt extending along a curved track in a substantially horizontal plane for transporting goods in a conveying direction, separate conveyor belt support stations for the upper and the lower strand of the conveyor belt, the separate conveyor belt support stations being spaced along the curved track and each of said stations having at least one conveyor belt strand support roller rotatable about an axis extending transversely to the conveying direction, and each conveyor belt support station being independently freely pivotal in a pivoting path in response to forces applied to the conveyor belt strands about an axis extending above the conveyor track and substantially parallel to the conveying direction, the pivoting path extending transversely to the conveying direction and rising towards the center point of the curvature of the track.

6 Claims, 5 Drawing Figures

TRANSPORT INTALLATION

The invention relates to a transport installation, in particular a conveyor belt, with a conveying track substantially disposed in a horizontal extending plane and having a curvature, in which installation the conveying means, for example a conveyor belt designed to receive the transported material, extends continuously through the conveying track and is supported in a frame having at least one roller station equipped with at least one rotatable roller extending crosswise relative to the direction of conveyance and being mounted for pivoting around an axle extending in and parallel to the direction of conveyance.

In such a transport installation, which is known from German patent DE-PS No. 622 057, the individual roller stations, which have rollers arranged in the form of a trapeze are supported on an axle mounted beneath the conveying track and extending in the direction of conveyance. However, such a system has a drawback in that when the tensile load acting on the conveyor belt increases, a force acts on the rollers disposed on the inside of the curve of the conveying track, such force acting towards the center of the curvature of such track, which causes the rollers to tilt downwardly, so that the frames supporting the rollers have to be connected with the axle in such a way that they are secured against twisting, or secured against tilting in some other way, for example with the help of stop means limiting the swivel motion of the frame, in order to prevent the conveyor belt from slipping off. To accomplish this, however, the tilt of the individual frames so fixed has to be adapted to an average load and speed of the conveyor belting. This, however, has the drawback that if the load deviates from such average load, the crosswise tilt, which is also referred to as the "camber", will only very incompletely satisfy the actual conditions.

The object of the invention is to avoid such drawback and to propose a transport installation of the type specified above that permits within the zones of the curves of the track a crosswise tilt depending on the load acting on the conveying tracks.

According to the invention, this is accomplished by providing the installation with a plurality of roller stations, which are mounted immovable in the direction of conveyance, and by mounting the roller stations disposed within the zone of the curvature in such a way that the latter are capable of freely swinging around an axis extending in the direction of conveyance in accordance with the forces generated and arranged above the conveying track in a known manner, and the path of swivel of such roller stations ascends or rises towards the center point of the curvature of the conveying track crosswise relative to the direction of conveyance. In this way, the crosswise tilt of the conveying tracks is largely depending on the free play of the forces produced, resulting in a lift of the rollers disposed on the inside of such roller stations due to the fact that the path of swivel extending transversely relative to the direction of conveyance rises towards the center point of the curvature of the conveying track when the force acting on the conveyor belt increases, which safely prevents the conveyor belt from slipping off.

In such an installation, the roller stations may be arranged suspended on a physical axle mounted above the conveying track.

According to another feature of the invention, the roller stations or their frames may have a substantially circular shape and be supported on two roller stands, which are spaced apart in the crosswise direction relative to the conveying track, and whose axles supporting the rollers are aligned substantially parallel with the conveying track.

This permits a very simple arrangement of the transport installation with bearing points that are, relatively speaking, readily accessible, so that the required maintenance work can be carried out without great expenditure.

In this preferred embodiment of the invention, the frame may have an angle-shaped bottom girder, and the rollers of the roller stands may have inclined surfaces, at least one safety catch preferably being provided for preventing tilting and lift-off, the latter extending over the bottom girder, which results in a very simple construction of the individual roller stations.

Furthermore, so as to assure optimal operation of the conveyor belt, the roller stations of the two strands of the conveyor belt may be supported in a way such that they are capable of swinging independently of each other, which permits the roller stations supporting the lower strand of the conveyor belt to adjust their tilt as required depending on the speed. Usefully, each roller station is provided with stop means for limiting the angle of swivel.

The invention is explained in greater detail in the following with the help of the drawing, in which:

FIG. 1 shows that the transport installation 1 has a circularly arcuate curvature substantially disposed in a horizontal plane.

Figure 2:
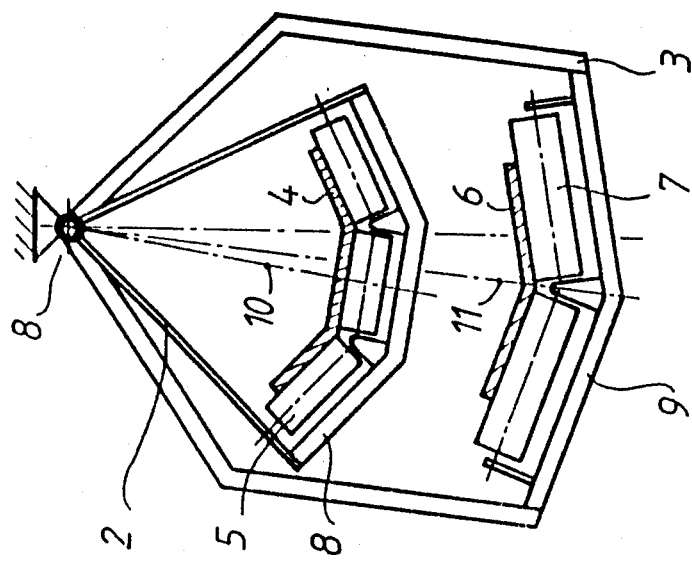
FIG. 2 is a sectional view along line A—A in FIG. 1 of a first embodiment.
Figure 1:
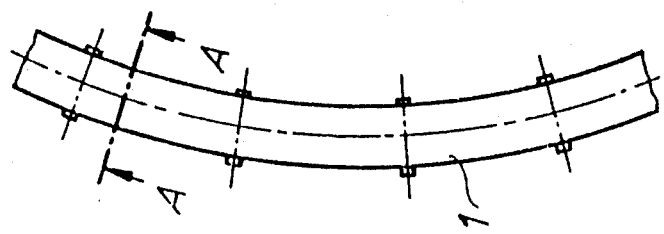
FIG. 1 is a top view of a transport installation according to the invention.

In the embodiment shown in FIG. 2, the frames 2 and 3 of the roller stations 5 and 7 supporting the upper strand 4 and lower strand 6, respectively, of the conveyor belt are pivotally suspended on an axle 8 extending parallel to the conveying track. This permits the frames 5 and 7 to adapt themselves to the centrifugal force and force of gravity acting on frames as a result of the speed of, and load on, the conveyor belt in a way such that the resultant of these forces extends vertically through the center of the chord of the bottom girders 8 and 9 of the frames 5 and 7, respectively, as indicated by the axes 10, 11 shown by dashed lines.

If the conveyor belt is designed for one speed only or the speed of the drive is invariable, the roller station 7 supporting the lower strand 6 may be fixed in its crosswise inclination without resulting in any drawbacks during the operation of the installation, i.e., this roller station 7 needs not to be pivotally suspended.

Figure 3:
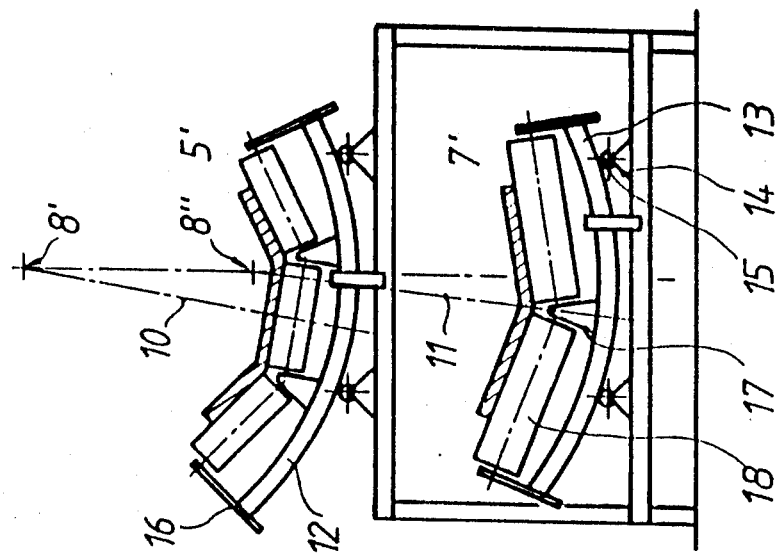
FIG. 3 shows a section along line A—A in FIG. 1 of a second embodiment.

In the embodiment according to FIG. 3, the bottom girders 12 and 13 of the roller stations 5' and 7', respectively, are supported on the rollers 15 of roller stands 14, bottom girders 12 and 13 having a circularly arcuate shape and the axes of the rollers 15 extending substantially parallel to the conveying track.

Side plates 16 are fastened to the ends of the bottom girders 12 and 13 and extend below the underside of the bottom girders 12, 13, so that they serve as stops limiting the possible angle of swivel. The rollers 18 of the roller stations 5' and 7', on which the conveyor belt strands rest, are rotatably supported both in the lateral plates 16 and the bearing blocks 17 fastened on the bottom girders 12 and 13.

In this embodiment, too, the roller stations 5' and 7' are capable of freely adapting themselves to the forces acting on such stations, disregarding the limitation effected by the stop means, whereby swiveling takes place around the imaginary axis 8' and 8'', respectively, such axis being determined by the center point of the circle defined by the bottom girders 12 and 13.

Figure 4:
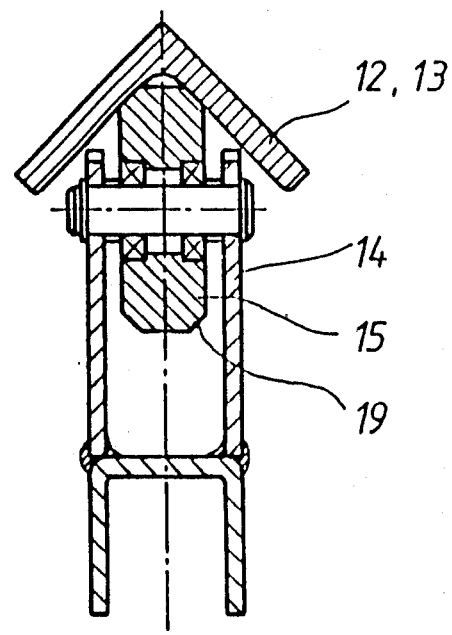
FIG. 4 shows a section through a roller stand of the embodiment according to FIG. 3.

FIG. 4 shows that the bottom girders 12, 13 are formed by an angle section resting on the rollers 15 of the bearing blocks 14, such rollers being provided with bevelled supporting surfaces.

Figure 5:
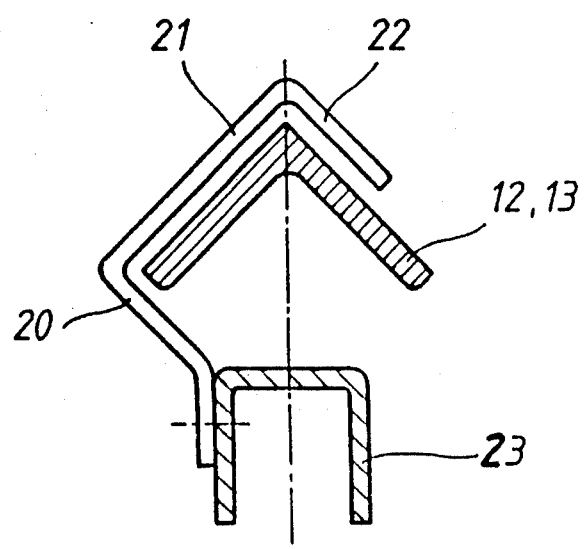
FIG. 5 shows a section through the tilt and lift-off safety device of the embodiment according to FIG. 3.

To prevent the bottom girders of roller stations 5', 7' from laterally gliding off the bevelled supporting surfaces of girder support rollers 15, a safety device 20 is fastened to fixed support frame 23 (see FIG. 5). The safety device has legs 21, 22 which extend parallel to, and over, the legs of angle-shaped bottom girders 12, 13 of the support frames of roller stations to prevent the bottom girders from being lifted off, or laterally gliding with respect to, support rollers 15.

Basically it is to be noted that in the embodiment according to FIG. 3, the frames of the roller stations may be designed also in a way such that they swing around a common axle 8'. However, in this case, the radius of the bottom girder 13 has to be correspondingly larger than the one of the bottom girder 12.

I claim:

1. A transport installation comprising
   (a) a conveyor belt having an upper and a lower strand, the conveyor belt extending along a track in a substantially horizontal plane for transporting goods in a conveying direction and the track being curved about a center point of curvature,
   (b) a support frame means for the conveyor belt, the support frame means including
      (1) separate upper and lower vertically aligned conveyor belt support stations for the upper and the lower strands of the conveyor belt, the separate upper and lower vertically aligned conveyor belt support stations being spaced along the curved track and each of said stations having at least one conveyor belt strand support roller rotatable about an axis extending transversely to the conveying direction, and
      (2) each of the upper and lower conveyor belt support stations being independently freely pivotal in a pivoting path in response to forces applied to the conveyor belt strands about an axis extending above the conveyor track and substantially parallel to the conveying direction, the pivoting path extending transversely to the conveying direction and rising towards the center point of the curvature of the track.

2. The transport installation of claim 1, further comprising an axle extending along the axis above the conveyor track, and each conveyor belt support station being independently freely pivotally suspended on said axle.

3. The transport installation of claim 1 wherein the support frame means has a circularly arcuate support girder for the conveyor belt strand support roller or rollers of each separate upper and lower vertically aligned conveyor belt support stations, and two bearing blocks spaced from each other transversely to the track, each bearing block including a roller supporting the circularly arcuate support girder and the bearing block rollers being rotatable about axes extending substantially parallel to the track for freely pivotally supporting the support girders transversely to the conveying direction.

4. The transport installation of claim 3, wherein the circularly arcuate support girders have angle-shaped cross sections, the bearing block rollers having bevelled edges engaged by, and supporting, the angle-shaped support girders.

5. The transport installation of claim 4, further comprising a safety device extending transversely over each support girder for holding the support girder on the bearing block rollers.

6. The transport installation of claim 3, further comprising stop means at each station for limiting the pivoting angle of the support girders.

* * * * *